May 19, 1970   Z. R. HUELLE   3,512,415

SENSOR FOR A THERMOSTATIC SYSTEM

Filed Jan. 31, 1968

United States Patent Office 3,512,415
Patented May 19, 1970

3,512,415
SENSOR FOR A THERMOSTATIC SYSTEM
Zbigniew Ryszard Huelle, Sonderborg, Denmark, assignor to Danfoss A/S, Nordborg, Denmark, a company of Denmark
Filed Jan. 31, 1968, Ser. No. 702,040
Claims priority, application Germany, Feb. 2, 1967, D 52,171
Int. Cl. G01k 5/32
U.S. Cl. 73—368.2                 11 Claims

ABSTRACT OF THE DISCLOSURE

A vapor-pressure type thermostatic sensor in which the working fluid is a volatile liquid at a selected level and the method of forming a film in the sensor for rendering the sensor more sensitive and responsive to temperature changes being sensed. The method comprises containing a volume of volatile liquid and the vapor thereof and vaporizing some of the volatile liquid in response to application of heat to increase the liquid's vapor pressure until a given condition of equilibrium obtains. Some of the vapor is condensed in response to temperature changes until a new condition of vapor-pressure equilibrium obtains and a film of the condensed liquid is maintained in contact with the vapor in an area of contact separate from the principal volume of volatile liquid in readiness for new vaporization in response to temperature increases. The vaporizable liquid in the film will quickly vary the vapor pressure in response to new temperature increases being sensed. The film increases the effective vapor-generating surface so that the response and sensitivity of the sensor can be increased by a factor of ten. The interior surfaces of the sensor are etched or comprise a coating or wire gauze to effect the formation of the liquid film by surface tension.

---

This invention relates generally to thermostatic systems and more particularly to a vapor-pressure type sensor for a thermostatic system in which the working fluid is volatile liquid at a selected level and the vapor thereof.

Thermostatic systems having sensors which are temperature-responsive generally have the sensor connected by means of a capillary tube to a thermostatic operating element or medium which can control a valve, an electric switch or the like. The vapor pressure in the system which acts upon the operating or controlling medium is a measure of the temperature sensed by the sensor. In such thermostatic controls the requirement is that the sensor should respond rapidly as possible to each change in the temperature being sensed.

The response time of sensors has been heretofore accomplished by providing in the interior of the sensor a component having good thermal conductance or good heat transfer characteristics, for example a coil or spring, which is in contact with the wall of the sensor. In this way the heat passing through the wall of the sensor is transferred into the actuating or working fluid. However, the use of such response time improvement means is suitable usually only in the case of thermostatic systems having the sensors completely filled with liquid. In the vapor-pressure type thermostatic sensor the quantity of liquid is so small that such a component does not contribute very much to improving response time or sensitivity on the part of the sensor.

It is a principal object of the present invention to provide a vapor-pressure type sensor having a highly increased response time and highly improved sensitivity to variations in the temperature conditions being sensed and in response to which a controlled function is executed.

The sensor according to the invention comprises a much larger vaporization area for the working fluid than heretofore. Thus the vapor-pressure equilibrium corresponding to a temperature change can be established more rapidly. The sensitivity and response time of the sensor is improved by having a very large liquid vapor-generating surface always present, independent of the volume of volatile liquid confined in the sensor, so that vapor changes can be readily effected. The enlarged liquid surface is accomplished by developing, at least above the level of the volatile liquid, on the inner or interior surfaces of the sensor wetting of the interior surfaces or formation of a film of the volatile liquid as a result of surface tension. The large film liquid surface is developed as vapor of the volatile liquid condenses and is in direct contact with the vapor thereby changing vapor pressure rapidly. Development of the liquid film over the inner or interior surfaces results in a sensor which is highly responsive regardless of the position of mounting thereof since the very large liquid film surface is always maintained regardless of mounting position of the sensor.

The wetting of the interior surface of the sensor by the liquid and the development of the liquid film on the basis of surface tension is accomplished in several ways. Thus the inner surfaces may be roughened, for example by etching. A further possibility of developing and maintaining a film of the working fluid on the inner surfaces by surface tension consists in applying a metal gauze to the inner surface portion. The metal gauze is in contact with the inner surfaces and can be thought of as part of the interior surface of the sensor. The metal gauze mesh is selected such that the liquid being used can, due to surface tension, remain on the metal gauze and between the gauze and the inner surface of the sensor developing the liquid film desired.

Another feature of the sensor in accordance with the invention is that the inner surfaces developing the liquid film and maintaining it may be coated or covered with different materials for example, kaolin, silica gel, asbestos, or a manganese phosphate deposit. These various materials insure the liquid film development by surface tension and may include capillary action of the liquid while any condensed vapor of the liquid that has greater cohesion and forces acting thereon which are greater than the forces of the surface tension simply runs off and leaves the remaining desired liquid film on the interior surfaces of the sensor which are not in contact with the volume of volatile liquid in the sensor.

The provision of the liquid film results in improved response time of a sensor. Thus if the operating or response time of a sensor, for example operating a valve, is normally 30 seconds it is reduced to about 3 seconds, i.e. an improvement factor of ×10 is achieved. Moreover, the hysteresis of the valve is likewise greatly improved.

It has been found that the sensor construction and operating principles in accordance with the invention can likewise improve the characteristics of two-component working fluid sensors in which an addition to the volatile liquid comprises a substance which, in the operating range, is gaseous and is preferably inactive. Such two-component working fluids offer known advantages but have the disadvantage that the vaporization rate is reduced as a result of the pressure of the gas component and the speed of response is thereby reduced. Using the principles in accordance with the present invention increases the vaporization rate in such sensors to such an extent that two-component working fluids can also be used under all operating conditions.

Other features and advantages of the thermostatic sensor and method in accordance with the present invention will be better understood as described in the following specification and appended claims in conjunction with the following drawings in which:

Figure 1:
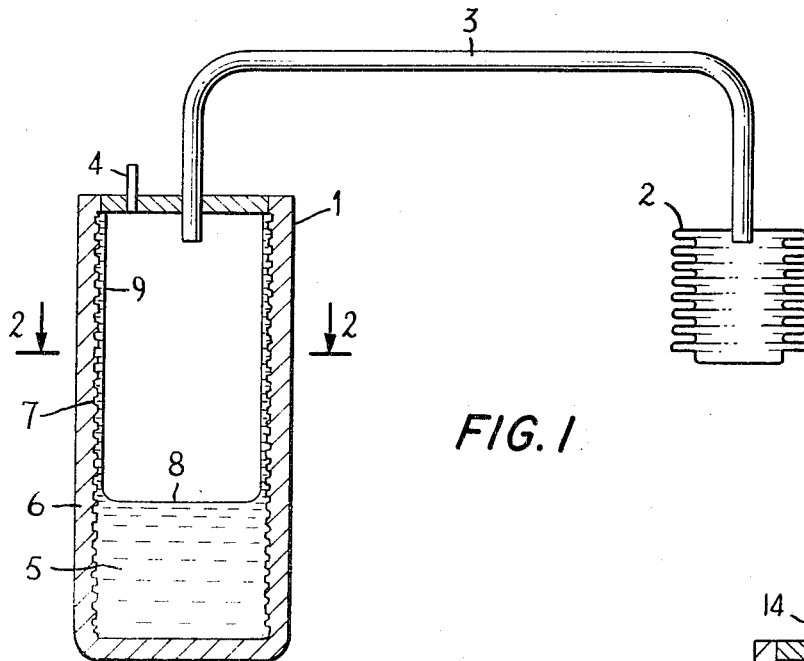
FIG. 1 is a diagrammatic elevation view of a thermostatic system provided with a sensor, illustrated in section in accordance with the invention.
Figure 2:
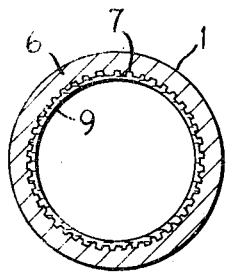
FIG. 2 is a cross section view taken on line 1—1 of FIG. 1.

The thermostat or thermostatic system shown in the drawings, FIGS. 1 and 2, comprises a vapor-pressure type sensor 1 and an operating element or medium constructed as a bellows 2 connected to the sensor by means of a capillary tube 3 in order to sense vapor pressure variations in the sensor 1 and respond thereto and thereby carry out a desired controlled function or operation. The sensor 1 is closed at either end and has a filling port 4 or a volatile liquid 5 contained in a cylinder 6 at a selected level so that a major volume of the sensor cylinder is left for the vapor of the liquid therein. The volatile liquid and its vapor are contained and confined in the system including the heat conductive cylinder 6, the bellows 2 and the connecting tube 3. The entire interior wall surfaces 7 of the hollow cylinder sensor 6 comprise a roughness such that a plurality of recesses are formed thereon. These recesses are illustrated in an exaggerated condition in the drawing and are formed, for example by etching, so that the recesses are only a fraction of a millimeter in depth. The recesses are disposed, circumferentially and axially on the cylinder 6, over the inner surfaces above a selected level 8 of the volume of volatile liquid 5.

In operation a liquid film 9 is formed over the wall surfaces 7 due to condensing vapors and maintained thereon by surface tension. The surface tension may be so effective and great that liquid is actually drawn upwardly from the surface 8. This can occur particularly when the surface of the sensor has an absorptive covering, as hereinafter explained. The formation of the film 9 of liquid takes place as vapor above the level 8 condenses as the temperatures being sensed drop. The film provides intimate interfacial contact between it and the liquid's vapor and has good thermal contact with the cylinder 6 and the vapor so that the film is quite effective in improving the response time of the sensor to temperature variations sensed by the sensor 1. The film increases the effective vapor-generating surface and the inner surfaces, which are heat conductive, developing and maintainng the liquid film thus comprise means to effectively form a liquid film thereover and place the cohesion forces of the volatile liquid film in equilibrium so that the liquid film 9 is maintained on the surfaces by surface tension.

A sensor having this kind of inner surface can operate substantially equally well in several operating positions. For example, if it is mounted horizontally the surface available for vaporization alters only slightly as a result of the change in position from the vertical.

Other constructions of the sensor and provision of the effective inner surfaces can be accomplished by coating or covering the inner wall surfaces of the sensor to effectively carry out the development of the liquid film and maintain it. It has been found that the heat-conducting interior surfaces of the sensor may be covered with heat-conductive covering or coating comprising for example kaolin, silica gel ($SiO_2$), asbestos or a manganese phosphate deposit. As heretofore mentioned the asbestos may be absorptive and improve capillary action so that the wetted surfaces are constantly maintained thus aside from any formation of the film caused by condensation of the vapor which is the usual way in which the film is formed.

Figure 3:
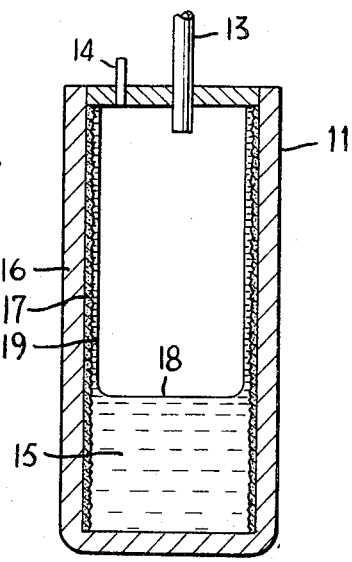
FIG. 3 is an elevation view, in section, of another embodiment of a sensor according to the invention.

A second embodiment of a sensor 11 having an interior coating or covering effective to carry out the development of the liquid film and maintain it is illustrated in FIG. 3. The sensor 11 comprises a cylinder 16 containing a liquid 15 supplied through a filling port 14 and having an interior covering or coating 17 on which a film 19 is formed above the level 18 in the manner of the first described embodiment. The coating or covering is made of a clay material such as kaolin, or silica gel or a manganese phosphate deposition or an asbestos covering as before described.

It has been found that the inner surfaces 7 may be covered with a wire gauze mesh so that the spaces in the mesh are operative somewhat comparable to the recesses illustrated in the drawing as to the first embodiment and a film can be developed by surface tension thereon. The mesh is chosen in accordance with the volatile liquid being used and its surface tension characteristics. The sensors constructed with the wire gauze or the coverings or coatings heretofore explained function in a manner heretofore described.

Figure 4:
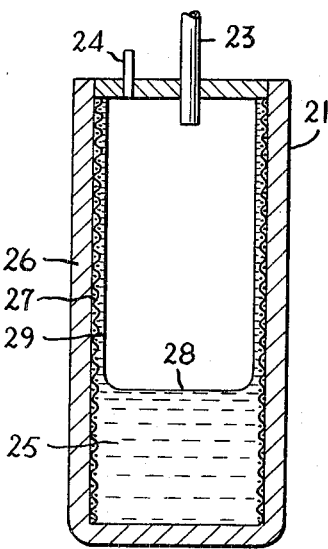
FIG. 4 is an elevation view, in section, of still another embodiment of a sensor embodying the principles of the invention.

An embodiment of a vapor-pressure type sensor 21 having a wire mesh or screening 27 over the inner wall surface of a cylinder 26 containing a volatile fluid 25 filled through a filling port 24 is shown in FIG. 4. A liquid film 29 is formed above the level 28. The wire screening 27 is in intimate contact with the heat conductive inner wall surfaces of the cylinder 26. The film 29 is formed in the mesh, over the screen and between the screen and the cylinder wall surfaces so that it has intimate interfacial contact with the sensor surfaces carrying out the temperature sensing and the working vapor above the level 28 so that vapor pressure changes are quickly executed in response to temperature variations.

Tests indicate that the response time of thermostatic vapor-pressure type sensors constructed in accordance with the invention is improved by a factor of ×10. For example the response time of thermostatically controlled valves has been reduced from about 30 seconds to about 3 seconds by employing the principles in accordance with the invention in thermostatic systems using a sensor of the type disclosed. Moreover, the hystersis of the control valve has been found to be greatly improved.

Those skilled in the art will thus recognize that the inventon teaches a new construction of vapor-pressure type sensors for thermostats and other thermosatic systems. A method for improving response characteristics of such sensors and the control systems is taught by the invention in which a volatile working fluid and is vapor contained and confined. Some of the volatile liquid is vaporized in response to variations of a temperature being sensed and applied to the liquid. A given vapor-pressure equilibrium is established. As the temperature varies downwardly some of the vapor is condensed until a new condition of vapor-pressure equilibrium obtains. As the vapor condenses above the level of the liquid a thin film of liquid is formed from the condensed vapors in contact with other similar vapor and is maintained above the level in an area separate from the volume of volatile liquid in readiness for new vaporization in response to temperature increases thereby to quickly vaporize liquid in the liquid film and quickly vary the vapor pressure in response to temperature variations being sensed and establish a new given vapor-pressure equilibrium. The vapor pressure variations are sensed and responsed thereto to execute a controlled function or operation as a function of the vapor pressure changes representative of the temperature changes.

Moreover, those skilled in the art will understand that the roughened surfaces such as the etching or the coating or covering material are shown in exaggerated condition of roughness in the various figures of the drawing in order to show the existence of recesses in the surface on which the thin liquid films are formed in the various embodiments. Moreover, the thin films of liquid are likewise exaggerated in thickness in order to diagrammatically illustrate their presence and position.

While preferred embodiments of the invention have been shown and described it will be understood that many modifications and changes can be made within the true spirit and scope of the invention.

What I claim and desire to be secured by Letters Patent is:

1. For use in a thermostatic system, a temperature-responsive vapor-pressure type sensor having a working fluid comprising a volume of volatile liquid therein at a selected level and vapors of said liquid above said level in operation, said sensor having thermally conductive interior surfaces at least above the level of the volatile liquid having an adhesion with said liquid greater than other forces acting upon condensed vapor of said volatile liquid thereby maintaining said interior surfaces wetted effectively increasing an area effective in generating vapor from said liquid and rendering said sensor more sensitive and responsive.

2. For use in a thermostatic system a sensor according to claim 1, in which said interior surfaces comprise means to effectively form a film of liquid thereover above the level of said liquid and effective to place the cohesion forces of the liquid film in equilibrium so that said film is maintained by surface tension.

3. For use in a thermostatic system a sensor according to claim 2, in which said interior surfaces are roughened.

4. For use in a thermostatic system a sensor according to claim 2, in which said interior surfaces comprise etched surfaces.

5. For use in a thermostatic system a sensor according to claim 2, in which said interior surfaces comprise a gauze having a mesh such that a film of volatile liquid remains thereon due to surface tension.

6. For use in a thermostatic system a sensor according to claim 5, in which said gauze is metallic.

7. For use in a thermostatic system according to claim 2, in which said interior surfaces comprise manganese phosphate deposited thereon as a coating.

8. For use in a thermostatic system according to claim 2, in which said interior surfaces comprise a kaolin covering.

9. For use in a thermostatic system according to claim 2, in which said interior surfaces comprise a silica gel covering.

10. For use in a thermostatic system according to claim 2, in which said interior surfaces comprise an asbestos covering.

11. For use in a thermostatic system according to claim 2, in which said sensor contains a substance in addition to said volatile liquid, said substance being inactive and gaseous in the operating temperature ranges of said sensor.

References Cited

UNITED STATES PATENTS

| | | | |
|---|---|---|---|
| 3,299,710 | 1/1967 | Pauli et al. | 73—368.2 |
| 3,399,717 | 9/1968 | Cline | 165—32 |

LOUIS R. PRINCE, Primary Examiner

W. A. HENRY, Assistant Examiner

U.S. Cl. X.R.

236—98